United States Patent [19]

Blasco et al.

[11] Patent Number: 5,257,359
[45] Date of Patent: Oct. 26, 1993

[54] INSTRUCTION CACHE BUFFER WITH PROGRAM-FLOW CONTROL

[75] Inventors: Richard Blasco, Auburn; Basant Khaitan, Palo Alto; Tony J. Chiang; Tahir Sheikh, both of Fremont, all of Calif.

[73] Assignee: Hitachi Microsystems, Inc., San Jose, Calif.

[21] Appl. No.: 908,803

[22] Filed: Jul. 7, 1992

Related U.S. Application Data

[63] Continuation of Ser. No. 764,981, Sep. 23, 1991, abandoned, which is a continuation of Ser. No. 308,139, Feb. 8, 1989, abandoned.

[51] Int. Cl.⁵ .............................................. G06F 13/00
[52] U.S. Cl. ...................... 395/425; 364/DIG. 1; 364/243.4; 364/243.41; 364/243.43; 364/244.3; 395/250
[58] Field of Search ............................... 395/250, 425

[56] References Cited

U.S. PATENT DOCUMENTS

| | | | |
|---|---|---|---|
| 3,938,097 | 2/1976 | Niguette, III | 364/200 |
| 4,571,674 | 2/1986 | Hartung | 364/200 |
| 4,654,778 | 3/1987 | Chiesa et al. | 364/200 |
| 4,905,196 | 2/1990 | Kirrmann | 365/200 |
| 4,918,597 | 4/1990 | Krishnan et al. | 364/200 |
| 4,949,252 | 8/1990 | Hauge | 364/200 |

FOREIGN PATENT DOCUMENTS

| | | |
|---|---|---|
| 0173981 | 12/1986 | European Pat. Off. . |
| 0207439 | 7/1987 | European Pat. Off. . |
| 0279421 | 8/1988 | European Pat. Off. . |

*Primary Examiner*—Eddie P. Chan
*Attorney, Agent, or Firm*—Flehr, Hohbach, Test, Albritton & Herbert

[57] ABSTRACT

A memory buffer for buffering data from an external memory to a processor including a cache memory, a first-in-first-out memory, a direct data path, a writing selector for writing data from the external memory to one of the cache memory, first-in-first-out memory and direct data path, a reading selector for reading data from one of the cache memory, first-in-first-out memory and direct data path and a controller for controlling the writing and reading selectors in response to the occurrence of certain conditions.

22 Claims, 4 Drawing Sheets

INSTRUCTION CACHE BUFFER WITH PROGRAM-FLOW CONTROL

This is a continuation of application Ser. No. 07/764,981, filed on Sep. 23, 1991, now abandoned, which is a continuation of application Ser. No. 07/308,139, filed on Feb. 8, 1989, now abandoned.

BACKGROUND OF THE INVENTION

1. Field of the Invention

This invention relates to a memory buffer and particularly to a memory buffer for utilization in a digital signal processor.

2. Prior Art

In the prior art there exists several schemes and devices for buffering a relatively slow external memory to a relatively fast processor unit. Such schemes and devices include the simplest register which consists of some predetermined small number of bits to a large cache memory. Furthermore, such registers or cache memories have been implemented utilizing hardware and software.

While such memory buffering schemes or devices have the capability of providing the instructions of a program to a processor at a relatively high rate when compared to the speed of the external memory, such devices all suffer from a major disadvantage in that none of them are capable of satisfying all of the various fetching requirements for the processing unit. In particular, the processing unit may require a fetch from a repetitive program loop and such a fetch is handled efficiently by a cache memory, but inefficiently by a register. Also a processor unit may request non-repetitive instructions from a particular sequence and such a fetch is efficiently handled by a register, but not by a cache memory. In addition, the prior art memory buffering schemes or devices only buffer instructions as they are executed and therefore the instruction must be executed before its instruction type can be determined. As a result, such prior art memory buffering schemes ignore program flow. Finally, the processor unit may request an instruction which is a conditional jump or branch and such an instruction is not handled efficiently by either a cache memory or register.

SUMMARY OF THE INVENTION

It is therefore a general object of the present invention to provide a memory buffer between a relatively slow external memory and a processing unit which provides the most efficient operation consistent with the particular fetch request made by the processing unit.

It is a specific object of the present invention to provide a memory buffer which efficiently handles repetitive program loops, non-repetitive instruction sequences and conditional jumps or branches.

It is another object of the present invention to provide a memory buffer which can be implemented utilizing very large scale integrated circuit techniques in a single integrated circuit chip.

It is still another object of the present invention to provide a memory buffer which can buffer the instructions before they are executed.

It is also another object of the present invention to provide a memory buffer which can predict program flow.

It is yet another object of the present invention to provide a memory buffer for a digital signal processor.

In keeping with the principles of the present invention, the objects thereof are accomplished by providing a unique memory buffer for buffering data from a relatively slow external memory to a relatively high speed processor. In particular, the memory buffer includes a cache memory made up of relatively high speed memory elements, a first-in-first-out memory made of relatively high speed memory elements, a direct data path, a means for writing data from the external memory to one of the cache memory, first-in-first-out memory and direct data paths in response to a control signal, a means for reading data from one of the cache memory, first-in-first-out memory and direct data paths to the processor in response to a control signal and a control means for sensing a condition of each of a predetermined plurality of indicia and for generating control signals in response to the condition of each of the predetermined plurality of indicia for controlling the reading and writing means. In particular, the predetermined plurality indicia are the address range of the data stored in the cache memory, the contents of the cache and the first-in-first-out memories, the type of instruction received from the external memory and the type of instruction requested by the processor. Furthermore, the control means also clears or flushes the cache and first-in-first-out memories in response to a predetermined set of conditions of each of the indicia.

BRIEF DESCRIPTION OF THE DRAWINGS

The above mentioned features and objects of the present invention will become more apparent with reference to following description taken in conjunction with the accompanying drawings wherein like reference numerals denote like elements and in which:

FIG. 3, comprising

DETAILED DESCRIPTION OF THE INVENTION

Figure 1:
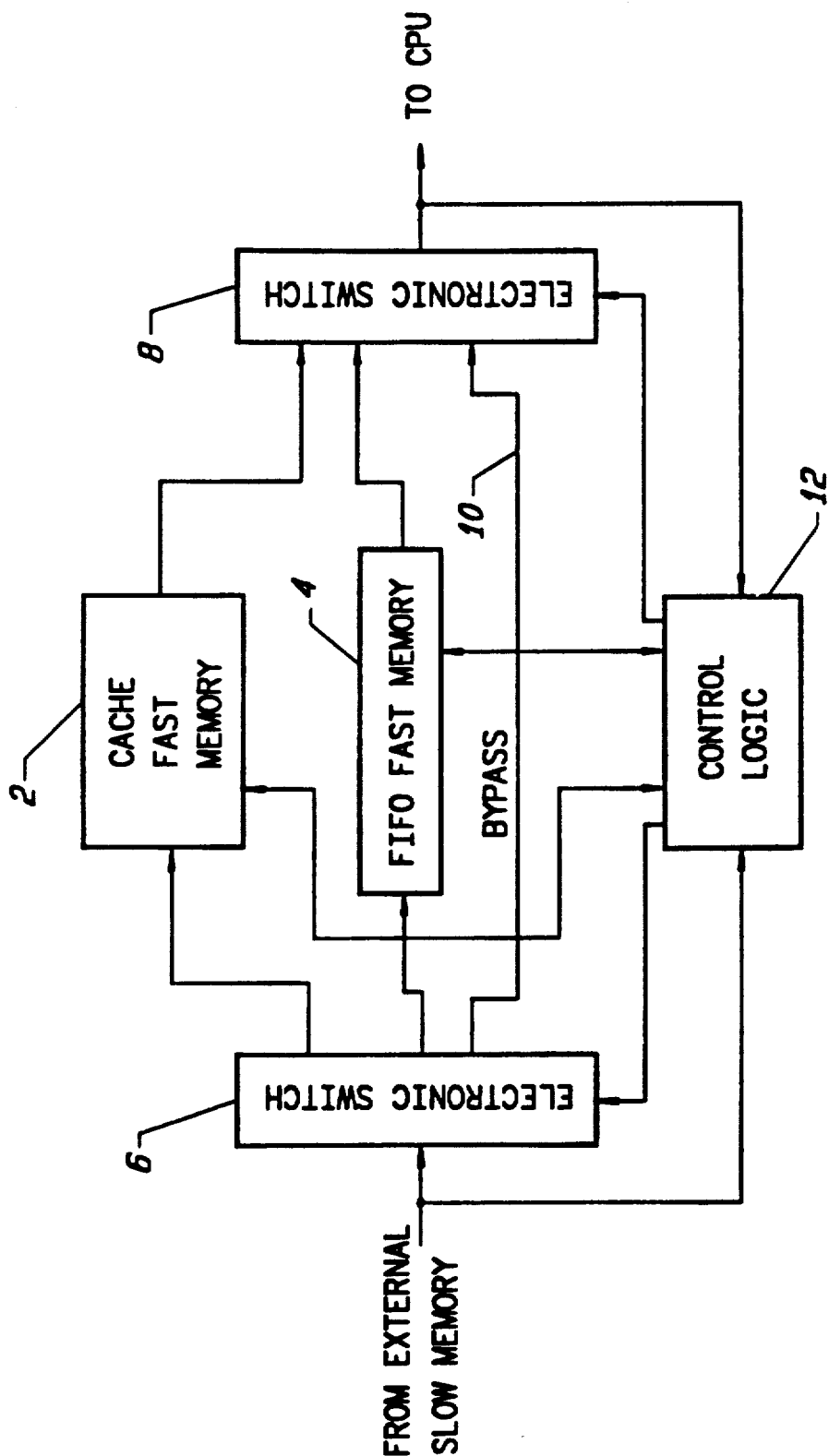
FIG. 1 is a simplified block diagram of a memory buffer in according with the teachings of the present invention.

Referring to FIG. 1, shown therein is a simplified block diagram illustrating a digital memory buffer in accordance with the teachings of the present invention. In particular, the digital memory buffer includes a cache memory 2 which is made up of a plurality of relatively fast memory elements whose speed is comparable to that of the processor unit. In addition, the cache memory 2 is made up of M words of N bits. Typically, the number of words might be 128 and the number of bits would be 16. As a result, the range of addresses found in the cache memory 2 would be the address of the first instruction plus M, i.e. the first address plus 128.

The digital memory buffer further includes a first-in-first-out memory 4 which is also made up of relatively fast memory elements whose speed is comparable to that of the processing unit. The first-in-first-out memory 4 is made up of K words of L bits and K is typically a small number such as 8 or 16 while the L could be 16.

A first electric switch or multiplexer 6 is provided on the input side of the digital memory buffer and the input of the first electric switch 6 is connected to the relatively slow external memory. On the output side of the digital memory buffer is provided a second electric switch or multiplexer 8 and the output of the second electric switch 8 is coupled to the processing unit.

The first and second electric switches 6 and 8 can be implemented utilizing logical gates or transistors. The first electric switch 6 has a single input and three outputs; while the second electric switch 8 has three inputs and one output.

One output of the first electric switch 6 is coupled to the input of the cache memory 2; while the output of the cache memory 2 is coupled to one of the inputs of the second electric switch 8. Another output of the first electric switch 6 is coupled to the input of the first-in-first-out memory 4; while the output of the first-in-first-out memory 4 is coupled to one of the inputs of the second electric switch 8. The last output of the first electric switch 6 is connected directly to the last input of the second electric switch 8 and forms a bypass circuit 10.

Control logic 12 is also provided and the control logic 12 is coupled to both the external memory and the processing unit and further has signal coupling to both the cache memory 2 and the first-in-first-out memory 4. By means of these couplings to the external memory, processing unit, cache memory 2 and the first-in-first-out memory 4, the control logic 12 is able to determine the range of addresses stored in the cache memory, the contents of cache and the first-in-first-out memories, the type of instruction received from the external memory and the type of instruction requested by the processor. In addition, the control logic 12 is further able to clear or flush the cache memory 2 and first-in-first-out memory 4 based on these factors. The control logic 12 also generates control signals to both the first electric switch 6 and the second electric switch 8 which determines whether an instruction from the external memory is read into the cache memory 2, the first-in-first-out memory 4 or the bypass circuit 10; and whether the instruction sent to the processing unit is read from the cache memory 2, the first-in-first-out memory 4 or the bypass circuit 10.

In particular, the control logic 12 operates such that an instruction from the external memory is written to the first-in-first-out memory 4 if the address of the instruction is outside the cache memory range and the first-in-first-out memory 4 is not full. Also, the instruction from the external memory is written to the cache memory 2 if a repetitive loop instruction is detected, the address of the instruction of the repetitive loop are within the range of addresses of the cache memory 2 and are not located in the cache memory 2. Finally, the instruction from the external memory is written to the bypass circuit 10 and read by the processing unit in three instances. In particular, the bypass 10 is written to and read if the instruction is a conditional branch or jump or condition not met; the address of the instruction is not within the range of addresses of the cache memory 2 and the first-in-first-out memory 4 is empty; and the address of the instruction is within the range of addresses of the cache memory 2, but not presently located in the cache memory 2. In addition, during the third condition, the instruction is also written to the cache memory 2, but not read therefrom.

The instruction requested by the processing unit is read from the cache memory 2 if the address of the instruction is within the range of addresses of the cache memory 2 and the instruction is located in the cache memory 2. While the instruction requested by the processing unit is read from the first-in-first-out memory 4, if the address is outside the range of addresses of the cache memory 2, the first-in-first-out memory 4 is not empty and the previous instruction was not a conditional branch or jump or condition not met.

The control logic 12 further causes the cache memory 2 and first-in-first-out memory 4 to be flushed under particular conditions. In particular, the cache memory 2 is flushed or cleared if the repetitive loop instruction is outside of the range of addresses of the cache memory 2, while the first-in-first-out memory 4 is flushed if a bypass is required.

In operation, the processing unit makes a fetch request to the external memory. When the first fetch request is made, the cache memory 2 and the first-in-first-out memory 4 are empty. Since the cache memory 2 and the first-in-first-out memory 4 are empty, the instruction under the control of the control logic 12 will be fetched from the external memory via the bypass circuit 10. In addition, if the control logic 12 detects that the instruction is a repetitive instruction and the last instruction of the loop is within the range of the cache memory 2, the repetitive instruction together with the other instructions of repetitive loop will be Written into the cache memory 2. Alternately, if the control logic 12 determines that the instruction is not a repetitive instruction and outside cache range, the instruction will be written into the first-in-first-out memory 4 by the operation of the first electric switch 6 in response to a control signal from the control logic 12. The processing unit then requests or fetches the next instruction. If the control logic 12 determines that the address of the next requested instruction is within the range of addresses of the cache memory 2 and also located in the cache memory 2, the instruction will be read from the cache memory 2. If, on the other hand, the control logic 12 determines that the address of the instruction is within the range of addresses of the cache memory 2, but not located in the cache memory 2, the instruction will again be fetches via the bypass circuit 109 by appropriate operation of the first electric switch 6 and the second electric switch 8 in response to control signals from the control logic 12 and the instruction will be further written into the cache memory 2. In similar ways the control logic 12 will respond to the fetch requests from the processing unit, the contents and range of the cache memory 2, the contents of the first-in-first-out memory 4, the type and address of the instruction requested by the processing unit and the type of instruction requested from the external memory to write instructions into the digital signal buffer and read out instructions from the digital signal buffer to the processing unit.

Figure 2:
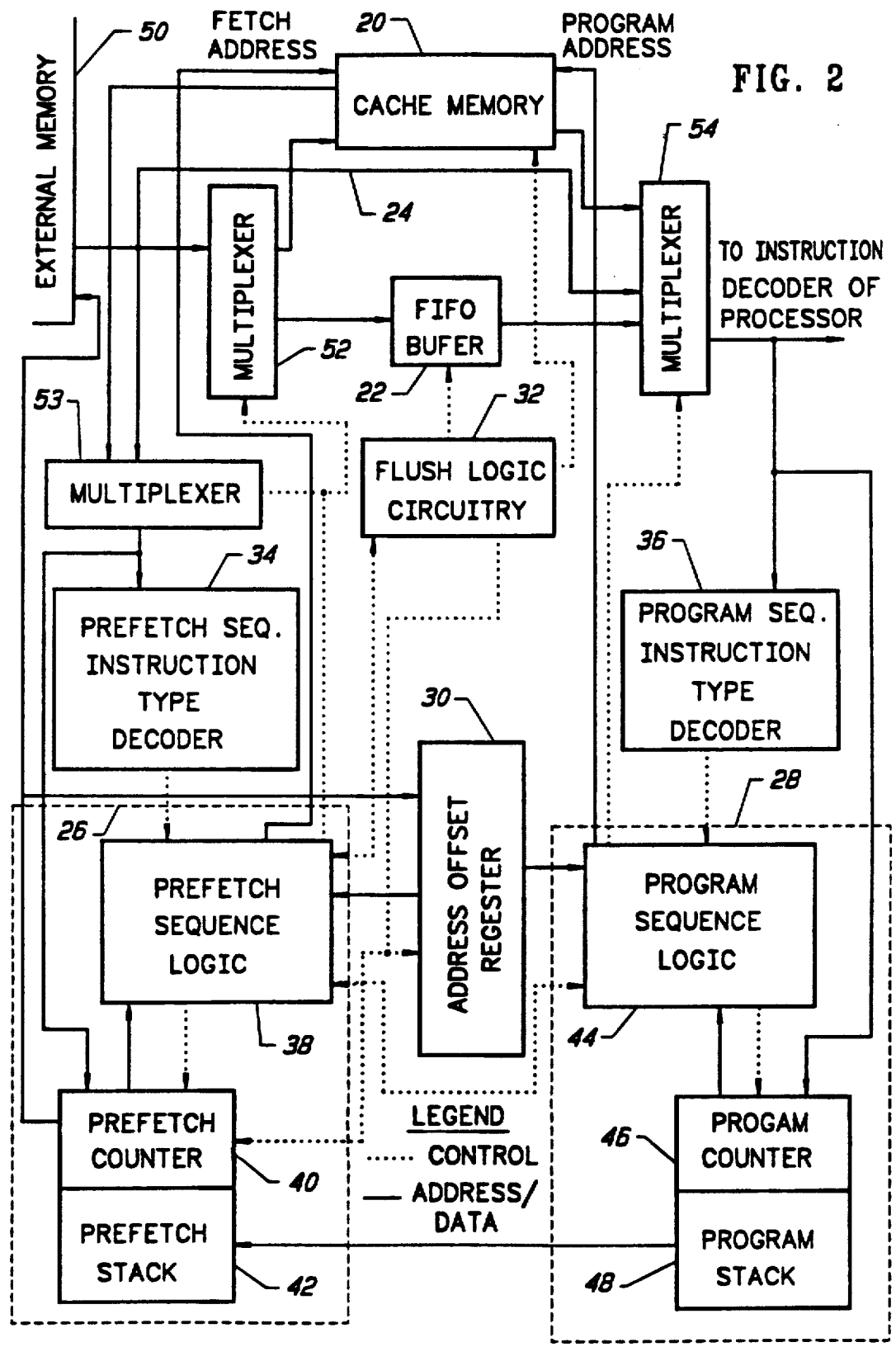
FIG. 2 is a detailed block diagram of a particular embodiment of a memory buffer for a digital signal processor in accordance with the teachings of the present invention.

Referring to FIG. 2, shown therein is a more detailed block diagram of a memory buffer for a digital signal processor in accordance with the teachings of the present invention. The memory buffer for a digital signal processor of the present invention is structured substantially as shown in FIG. 2. In FIG. 2 the solid lines indicate data and address information, while the dashed lines indicate control signals. In addition, the memory buffer shown in FIG. 2 comprises essentially a cache memory 20, a first-in-first-out buffer 22, a bypass path 24, prefetch and program sequencers 26 and 28, respectively, an address offset register 30, flush logic circuitry 32 and prefetch and program sequencer instruction type decoders 34 and 36, respectively.

The cache memory 20 consists of memory elements capable of storing M words by N bits, as previously described. In addition, each word has associated therewith an additional tag bit to indicate if that memory location is a valid or invalid memory location. As a result, if we assume that M equals 128 and N equals 16, then the cache memory 20 is capable of storing 128 words of 17 bits, 16 bits for the word length, plus one bit for the tag.

The first-in-first-out buffer 22 comprises memory elements capable of storing K words by L bits, as previously described. The number of words in the first-in-first-out buffer 22 is usually small.

The prefetch sequencer 26 comprises prefetch sequencer logic 38, prefetch counter 40 and prefetch stack 42; while the program sequencer 28 comprises program sequencer logic 44, program counter 46 and program stack 48. Both the prefetch and program sequencers 26 and 28, respectively, may be made from standard logic circuits, counters and finite state machines or sequential logic circuits which exist in the prior art.

The prefetch sequencer and program sequencer construction type decoders 34 and 36, respectively, determine the instruction type being received from the external memory and the instruction type being requested by the processor and supply this information to the prefetch sequencer 26 and program sequencer 28, respectively. The address offset register is essentially an arithmetic unit which keeps track of the real address of the external memory 50 which are within the range of addresses of the cache memory 20. In particular, the address offset register 30 receives the address from the external memory 50 which indicates the first address in the cache memory 20. The address offset register 30 then adds a number equal to N to that address from the external memory 50 and the resultant number together with the original address are the range of the cache memory 20. This range of information is provided to both the prefetch and program sequencers 26 and 28, respectively. The flush logic circuitry 32 receives control signals from the prefetch sequencer 26 and provides control signals to both the cache memory 20 and first-in-first-out memory 22 to clear or flush these memories upon certain conditions.

Figure 3A:
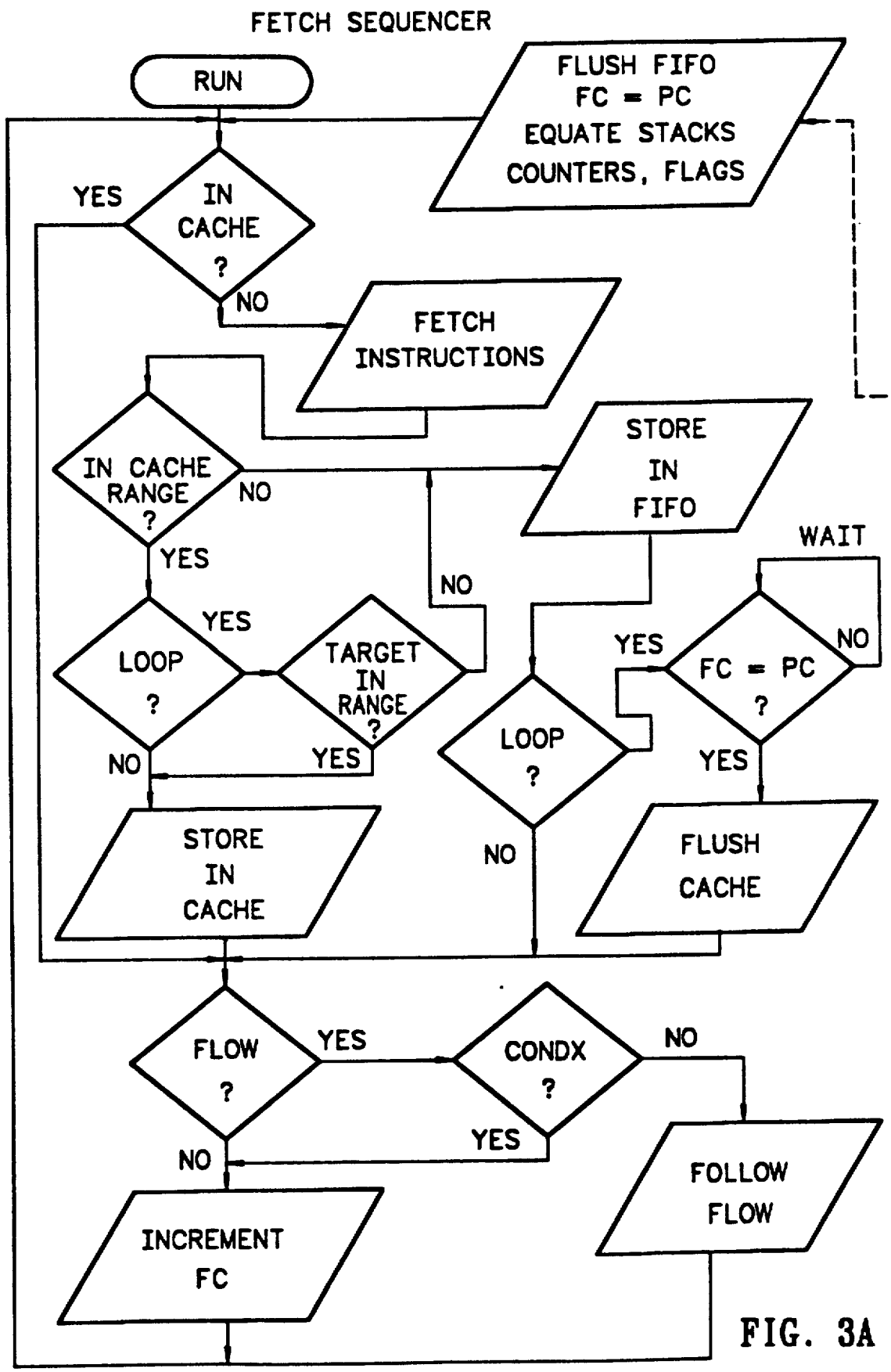
FIGS. 3A and 3B is a flow diagram of the external fetch and program controls.
Figure 3B:
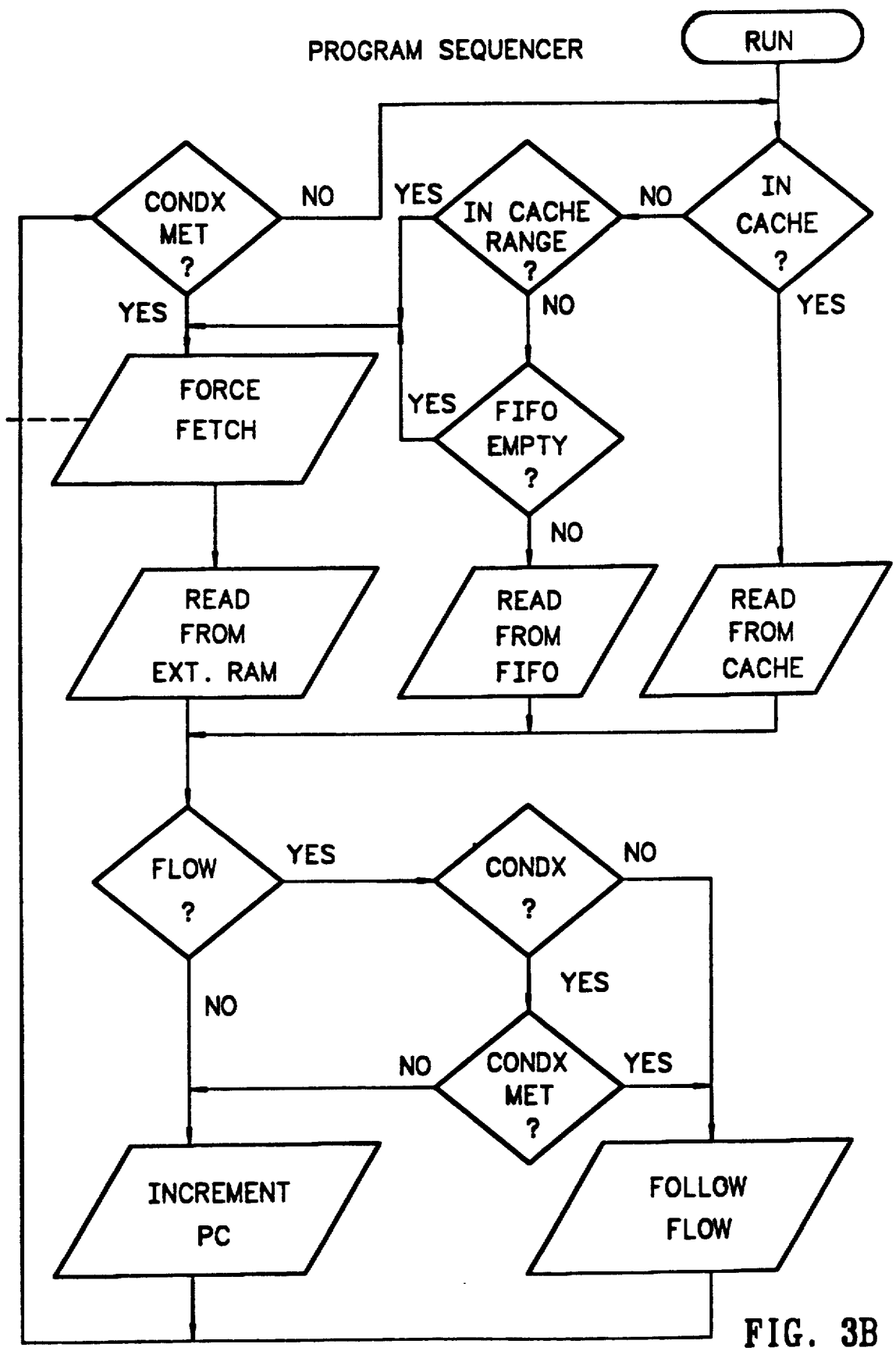

The operation of the digital signal process of the present invention will be described in detail in conjunction with FIG. 2 and is also shown in the attached flow diagram of FIG. 3 which illustrates the external RAM fetch control and the program control.

The prefetch sequencer 26 controls the reading and writing of instructions to the cache memory 20 and the first-in-first-out memory 22 and the bypass path 24. The prefetch sequencer 26 further emits address to the external memory 50 and controls the flow of data words to and from the external memory 50. The program sequencer 28 serves to retrieve instructions from the cash memory 20 and the first-in-first-out buffer 22 and the bypass path 24 and interfaces with the processor execution unit.

The prefetch sequencer 26 writes to the cache memory 20 when it determines that a repetitive instruction from the external emory 50 is within the range of the cache memory 20 but is not currently located in the cache memory 20. The prefetch sequencer 26 determines this by first examining the data from the address offset register 30 to determine if the address of the repetitive instruction is within the range of addresses of the cache memory 20. If the address of the instruction is within the range of the cache memory 20, the prefetch sequencer 26 then examines the tag bit associated with the address of the required repetitive instruction in the cache memory 20 to determine if it is valid. If it is not valid (for example, if the tag bit is 0) the prefetch sequencer 26 would direct that the repetitive instruction from the external memory 50 be written to the cache memory 20. It would also set the tag bit in the cache memory 20 to indicate the presence of valid data at this memory location in the cache memory 20. Alternately, if the prefetch sequencer 26 had determined that the tag bit was valid (for example, if the tag bit equaled 1), the prefetch sequencer 26 would skip fetching the instruction from the external memory. In addition, it should be pointed out that the prefetch sequencer 26 decodes each instruction fetched, regardless of whether the instruction is fetched from the cache memory 20 and the external memory 50. In this Way, the prefetch sequencer 26 keeps track of the program flow independent of the program sequencer 28. While the prefetch sequencer 26 is writing or reading the cache memory 20, the program sequencer 28 reads the contents of the cache memory 20 to determine its repetitive instructions. In particular, the program sequencer 28 reads the cache memory 28 whenever the instruction address is within the range of addresses of the cache memory 20 and the tag bit is valid.

By the above described construction and operation, a dual ported cache memory 20 may be provided and such a dual ported cache memory 20 would be very efficient at providing repetitive instructions and would improve the efficiency of execution of repetitive instructions by the processor; however, if more or less efficiency is required a multi-ported cache memory or a single-ported cache memory, respectively, could be provided.

In the same way that the cache memory 20 buffers repetitive instructions, the first-in-first-out buffer 22 provides buffering for the non-repetitive instructions. The first-in-first-out buffer 22 can be written under the control of the prefetch sequencer 26 on the external memory 50 side or read by the program sequencer 28 on the processor side. The prefetch sequencer 26 writes to the first-in-first-out buffer 22 when the address of the instruction is not within the range of the cache memory 20 and the first-in-first-out buffer 22 is not full. This writing into the first-in-first-out buffer 22 is performed with the contingency that the execution unit does not require the next instruction from the external memory which would result in a direct fetch. For example, a conditional jump instruction recognized by the program sequencer 28 based upon data from the program sequencer instruction type decoder 36 causes the instruction requested to be fetched directly from the external memory 50 to the execution unit of the processor via the bypass path 24. The program sequencer 28 reads the first-in-first-out buffer 22 whenever the instruction address is not within the range of the cache, the first-in-first-out buffer 22 is not empty, the previous instruction is a not in cache range. If, however, the first-in-first-out buffer 22 is empty, the processor would fetch the instruction directly from the external memory 50 via the bypass path 24.

Although the cache memory 20 and the first-in-first-out buffer 22 are utilized for a majority of the time to write instructions into and read instructions out of the memory buffer to the processor, three conditions exist wherein the processor must fetch the instruction directly from the external memory 50 via the bypass path 24. Firstly, a conditional instruction requires a direct fetch from the external memory 50 via the bypass path 24 when the condition is met since the prefetch sequencer 26 cannot predetermine the outcome of the conditional operation of the conditional instruction and assumes condition not met. Secondly, any instruction which is within the range of addresses of the cache memory 20, but not located in the cache memory 20 (the tag bit equals 0) and the prefetch counter 40 is not equal to the address instruction causes the processor to directly fetch the instruction from the external memory 50 via the bypass path 24. It should be pointed out that in this case, the instruction is also written to the cache memory 20 in order to save the instruction for the next repetitive execution. Thirdly, if the instruction is not within the range of addresses of the cache memory 20, the first-in-first-out buffer 22 is empty and the prefetch counter 40 is not equal to the instruction address, the processor again will directly fetch the instruction from the external memory 50 via the bypass path 24.

The program counter 26 and the prefetch counter 40 of the program sequencer 28 and prefetch sequencer 26, respectively, in conjunction with the address offset register 30 and the prefetch sequencer logic 38 and program sequencer logic 44 determine the effective address under consideration at any time. This operation is necessary since portions of the external memory 50, which are typically much larger than the cache memory 20 and the first-in-first-out buffer 22, must be mapped into the cache memory 20 and first-in-first-out buffer 22. Also, the effective address of the prefetch counter 40 and the program counter 46 are determined separately, thereby allowing the prefetch counter 40 and the program counter 46 to run independently and contribute to the efficiency of the memory buffer. In addition it should be apparent from FIG. 2 and the above description that the prefetch sequencer 26 and the program sequencer 28 cause the various external memory 50, cache memory 20, first-in-first-out buffer 26 and bypass path 24 accesses by controlling a plurality of multiplexers or electronic switches 52 through 54 by means of control signals.

In addition to the above, not only are instructions written into and read from the cache memory 20 and first-in-first-out buffer 22, the cache memory 20 and first-in-first-out buffer 26 are also flushed or cleared by the flush logic circuitry 32 upon the occurrence of certain conditions. In particular, when the flush logic circuitry determines that the target address of a repeat loop instruction requested by the processor is outside of the range of addresses of the cache, the flush logic circuitry 32 flushes or clears the cache memory 20 by updating the address offset register 30 and resetting the tag bits of all of the words in the cache memory 20 to be invalid (i.e., the tag bit equals 0). The first-in-first-out buffer 22 is flushed during use of the bypass path such as during the occurrence of a conditional instruction.

From the above description it should be apparent that the memory buffer for a digital display signal processor in accordance with the teachings of the present invention provides efficient and fast access to the instructions and data contained in an external memory without requiring a large number of expensive components. In addition, the memory buffer of the present invention can be simply implemented utilizing a relatively small number of individual circuits and also utilizing very large scale integrated circuit techniques on a single chip.

It should be apparent to those skilled in the art that the above-described embodiments are merely illustrative of a but a small number of implementations and variations of the present invention. Numerous and various other embodiments can be readily devised by those skilled in the art without departing from the spirit and the scope of the invention.

In particular, two or more cache memories, address offset register and first-in-first-out memories could be provided to increase the speed and efficiency and to prevent a stoppage of instruction fetching while waiting to flush a cache memory or first-in-first-out memory. In addition, if the efficiency need not be so high, the bypass path 24 could be eliminated and the instruction read through the cache memory 20 and first-in-first-out buffer 22.

What is claimed is:

1. An intelligent program-flow controlled memory buffer for buffering program instructions from an external memory made up of relatively slow speed memory elements to a processor which operates at relatively high speeds, said program-flow controlled memory buffer comprising:
   at least one cache memory made up of relatively high speed memory elements;
   at least one first-in-first-out memory made of relatively high speed memory elements, said first-in-first-out memory being substantially smaller than said cache memory;
   a direct program instruction path;
   means for writing program instructions from said external memory selectively to one of said cache memory, said first-in-first-out memory, and said direct program instruction path, in response to a first control signal;
   means for reading said program instructions selectively from one of said cache memory, said first-in-first-out memory, and said direct program instruction path, to said processor in response to a second control signal; and
   control means for sensing a condition of each of a predetermined plurality of indicia of said program instructions to determine what type of instruction is currently being prefetched and based on predetermined rules and said condition of each of said predetermined plurality of indicia of said program instructions being transferred for selecting a processor program instruction buffering path for a particular processor program by dynamically generating said first and second control signals, said first control signal having first characteristics that depend on said program instructions, said second control signal having second characteristics that depend on said program instructions, said first and said second characteristics indicating to said means for writing and said means for reading respectively, which one of said cache memory, said first-in-first-out memory, or said direct program instruction path is selected.

2. An intelligent program-flow controlled memory buffer in accordance with claim 1, further comprising means for flushing said cache memory and said first-in-first-out memory in response to predetermined conditions of each of said indicia.

3. An intelligent program-flow controlled memory buffer in accordance with claim 1, wherein said cache memory is a dual ported cache memory, said dual ports providing concurrent coupling of said cache memory to said means for reading and said means for writing.

4. An intelligent program-flow controlled memory buffer in accordance with claim 1, wherein said indicia comprises instruction type received from said external memory, instruction type requested by said processor, range of addresses stored in said cache memory, contents of said cache memory, and contents of said first-in-first-out memory.

5. An intelligent program-flow controlled memory buffer in accordance with claim 4, wherein said control means comprises a means for sensing the type of program instruction, the range of the addresses stored in the cache memory and the contents of said cache memory and said first-in-first-out memory.

6. An intelligent program-flow controlled memory buffer in accordance with claim 1, wherein said intelligent program-flow controlled memory buffer is implemented utilizing very large scale integrated circuit techniques in a single integrated circuit chip.

7. An intelligent program-flow controlled memory buffer for buffering program instruction data from an external memory made up of relatively slow speed memory elements to a processor which operates at relatively high speeds, said program-flow controlled memory buffer comprising:
 at least one cache memory made up of relatively high speed memory elements;
 at least one first-in-first-out memory made of relatively high speed memory elements, said first-in-first-out memory being substantially smaller than said cache memory;
 means for writing program instruction data from said external memory selectively to one of said cache memory and said first-in-first-out memory in response to a first control signal;
 means for reading said program instruction data selectively from one of said cache memory and said first-in-first-out memory to said processor in response to a second control signal; and
 control means for sensing a condition of each of a predetermined plurality of indicia of said program instruction data and based on predetermined rules and said condition of each of said predetermined plurality of indicia of said program instruction data being transferred for selecting a processor program instruction data path for a particular processor program by dynamically generating said first and second control signals, said first control signal having first characteristics that depend on said program instruction data, said second control signal having second characteristics that depend on said program instruction data, said first and said second characteristics indicating to said means for writing and said means for reading respectively, which one of said cache memory or said first-in-first-out memory is selected.

8. An intelligent program-flow controlled memory buffer in accordance with claim 7, further comprising means for flushing said cache memory and said first-in-first-out memory in response to predetermined conditions of each of said indicia.

9. An intelligent program-flow controlled memory buffer for buffering program instructions from an external memory made up of relatively slow speed memory elements to a processor which operates at relatively high speeds, said program-flow controlled memory buffer comprising:
 at least one cache memory made up of relatively high speed memory elements;
 at least one first-in-first-out memory made of relatively high speed memory elements, said first-in-first-out memory being substantially smaller than said cache memory;
 means for writing program instructions from said external memory selectively to one of said cache memory and said first-in-first-out memory in response to a first control signal;
 means for reading said program instructions selectively from one of said cache memory and said first-in-first-out memory to said processor in response to a second control signal; and
 control means for sensing a condition of each of a predetermined plurality of indicia of said program instructions to determine what type of instruction is currently being prefetched and said condition of each of said predetermined plurality of indicia of said program instructions being transferred for selecting a processor program instruction buffering path for a particular processor program by dynamically generating said first and second control signals, said first control signal having first characteristics that depend on said program instructions, said second control signal having second characteristics that depend on said program instructions, said first and said second characteristics indicating to said means for writing and said means for reading respectively, which one of said cache memory or said first-in-first-out memory is selected.

10. An intelligent program-flow controlled memory buffer in accordance with claim 7, wherein said indicia comprises instruction type received from said external memory, instruction type requested by said processor, range of addresses stored in said cache memory, contents of said cache memory, and contents of said first-in-first-out memory.

11. An intelligent program-flow controlled memory buffer in accordance with claim 10, wherein said control means comprises a means for sensing the type of program instruction, the range of the addresses stored in the cache memory and the contents of said cache memory and said first-in-first-out memory.

12. An intelligent program-flow controlled memory buffer in accordance with claim 7, wherein said intelligent program-flow controlled memory buffer is implemented utilizing very large scale integrated circuit techniques in a single integrated circuit chip.

13. An intelligent program-flow controlled memory buffer for buffering program instruction data from an external memory made up of relatively slow speed memory elements to a processor which operates at relatively high speeds, said program-flow controlled memory buffer comprising:
 at least one cache memory made up of relatively high speed memory elements;
 at least one first-in-first-out memory made of relatively high speed memory elements, said first-in-first-out memory being substantially smaller than said cache memory;
 a direct program instruction data path;
 means for writing program instruction data from said external memory selectively to one of said cache memory, said first-in-first-out memory, and said direct data path, in response to a first control signal;

means for reading said program instruction data selectively from one of said cache memory, said first-in-first-out memory, and said direct data path, to said processor in response to a second control signal;

means for sensing a condition of each of a predetermined plurality of indicia of said program instruction data;

means for selecting a processor program instruction data path for a particular processor program instruction retrieval from among a plurality of available data paths based on predetermined rules and said condition of each of said predetermined plurality of indicia of said program instruction data, so that efficient processor operation is achieved for different types of program instructions, said plurality of predefined data paths comprising said cache memory, said first-in-first-out memory, and said direct data path, said types of program instruction comprising repetitive program loops, non-repetitive instruction sequences, conditional jumps, and conditional branches; and means for generating said first and second control signals having control information determined by said means for selecting, said control information comprising information to which said means for writing and said means for reading are responsive to, and which identifies one of said cache memory, said first-in-first-out memory, or said direct data path.

14. An intelligent program-flow controlled memory buffer in accordance with claim 13, further comprising means for flushing said cache memory and said first-in-first-out memory in response to predetermined conditions of each of said indicia.

15. An intelligent program-flow controlled memory buffer for buffering program instructions from an external memory made up of relatively slow sped memory elements to a processor which operates at relatively high speeds, said program-flow controlled memory buffer comprising:

at least one cache memory made up of relatively high speed memory elements;

at least one first-in-first-out memory made of relatively high speed memory elements, said first-in-first-out memory being substantially smaller than said cache memory;

a direct program instruction path;

means for writing program instructions from said external memory selectively to one of said cache memory, said first-in-first-out memory, and said direct program instruction path in response to a first control signal;

means for reading said program instructions selectively from one of said cache memory, said first-in-first-out memory, and said direct program instruction path, to said processor in response to a second control signal;

means for sensing a condition of each of a predetermined plurality of indicia of said program instructions to determine what type of instruction is currently being prefetched;

means for selecting a processor program instruction buffering path for a particular processor program instruction retrieval from among a plurality of available program instruction paths based on predetermined rules and said condition of each of said predetermined plurality of indicia of said program instructions, so that efficient processor operation is achieved for different types of program instructions, said plurality of predefined program instruction paths comprising said cache memory, said first-in-first-out memory, and said direct program instruction path, said types of program instruction comprising repetitive program loops, non-repetitive instruction sequences, conditional jumps, and conditional branches; and means for generating said first and second control signals having control information determined by said means for selecting said control information comprising information to which said means for writing and said means for reading are responsive to, and which identifies one of said cache memory, said first-in-first-out memory, or said direct program instruction path.

16. An intelligent program-flow controlled memory buffer in accordance with claim 13, wherein said indicia comprises instruction type received from said external memory, instruction type requested by said processor, range of addresses stored in said cache memory, contents of said cache memory, and contents of said first-in-first-out memory.

17. An intelligent program-flow controlled memory buffer in accordance with claim 13, wherein said intelligent program-flow controlled memory buffer is implemented utilizing very large scale integrated circuit techniques in a single integrated circuit chip.

18. An intelligent program-flow controlled memory buffer for buffering program instruction data from an external memory made up of relatively slow speed memory elements to a processor which operates at relatively high speeds, said program-flow controlled memory buffer comprising:

at least one cache memory made up of relatively high speed memory elements;

at least one first-in-first-out memory made of relatively high speed memory elements, said first-in-first-out memory being substantially smaller than said cache memory;

means for writing program instruction data from said external memory selectively to one of said cache memory and said first-in-first-out memory in response to a first control signal;

means for reading said program instruction data selectively from one of said cache memory and said first-in-first-out memory to said processor in response to a second control signal;

means for sensing a condition of each of a predetermined plurality of indicia of said program instruction data;

means for selecting a processor program instruction data path for a particular processor program instruction retrieval from among a plurality of available data paths based on predetermined rules and said condition of each of said predetermined plurality of indicia of said program instruction data, so that efficient processor operation is achieved for different types of program instructions, said plurality of predefined data paths comprising said cache memory and said first-in-first-out memory, said types of program instruction comprising repetitive program loops, non-repetitive instruction sequences, conditional jumps, and conditional branches; and means for generating said first and second control signals having control information determined by said means for selecting, said control information comprising information to which said means for writing and said means for reading are responsive to, and which identifies one of said cache memory or said first-in-first-out memory.

19. An intelligent program-flow controlled memory buffer in accordance with claim 18, further comprising means for flushing said cache memory and said first-in-first-out memory in response to predetermined conditions of each of said indicia.

20. An intelligent program-flow controlled memory buffer in accordance with claim 18, wherein said cache memory is a dual ported cache memory, said dual ports providing concurrent coupling of said cache memory to said means for reading and said means for writing.

21. An intelligent program-flow controlled memory buffer for buffering program instructions from an external memory made up of relatively slow speed memory elements to a processor which operates at relatively high speeds, said program-flow controlled memory buffer comprising:
- at least one cache memory made up of relatively high speed memory elements;
- at least one first-in-first-out memory made of relatively high speed memory elements, said first-in-first-out memory being substantially smaller than said cache memory;
- means for writing program instructions from said external memory selectively to one of said cache memory and said first-in-first-out memory in response to a first control signal;
- means for reading said program instructions selectively from one of said cache memory and said first-in-first-out memory to said processor in response to a second control signal;
- means for sensing a condition of each of a predetermined plurality of indicia of said program instructions to determine what type of instruction is currently being prefetched;
- means for selecting a processor program instruction buffering path for a particular processor program instruction retrieval from among a plurality of available program instruction paths based on predetermined rules and said condition of each of said predetermined plurality of indicia of said program instructions, so that efficient processor operation is achieved for different types of program instructions, said plurality of predefined program instruction paths comprising said cache memory and said first-in-first-out memory, said types of program instruction comprising repetitive program loops, non-repetitive instruction sequences, conditional jumps, and conditional branches; and
- means for generating said first and second control signals having control information d determined by said means for selecting, said control information comprising information to which said means for writing and said means for reading are responsive to, and which identifies one of said cache memory or said first-in-first-out memory.

22. An intelligent program-flow controlled memory buffer in accordance with claim 18, wherein said intelligent program-flow controlled memory buffer is implemented utilizing very large scale integrated circuit techniques in a single integrated circuit chip.

* * * * *